United States Patent [19]
Yokota

[11] Patent Number: 5,922,230
[45] Date of Patent: Jul. 13, 1999

[54] AUTOMATIC REFLOW SOLDERING APPARATUS

[75] Inventor: Yatsuharu Yokota, Tokyo, Japan

[73] Assignee: Eightech Tectron Co., Ltd., Tokyo, Japan

[21] Appl. No.: 08/806,910

[22] Filed: Feb. 26, 1997

[30] Foreign Application Priority Data

Mar. 8, 1996 [JP] Japan ................................. 8-051762

[51] Int. Cl.$^6$ .............................. F27B 9/24; B23K 1/008; B23K 32/02; B65G 37/00
[52] U.S. Cl. .................... 219/388; 228/180.1; 198/465.3
[58] Field of Search .......................... 219/388; 99/443 C; 228/43, 180.1; 198/465.3

[56] References Cited

U.S. PATENT DOCUMENTS

| | | | |
|---|---|---|---|
| 4,512,510 | 4/1985 | Kondo | 228/43 |
| 4,909,430 | 3/1990 | Yokota | 219/388 |
| 4,962,695 | 10/1990 | Northrup | 99/443 C |
| 5,024,370 | 6/1991 | Yokota | 228/180.1 |
| 5,242,096 | 9/1993 | Tsunabuchi et al. | 228/43 |
| 5,465,827 | 11/1995 | Nakagawa et al. | 198/465.3 |
| 5,495,933 | 3/1996 | Gyger | 198/465.3 |

*Primary Examiner*—Joseph Pelham
*Attorney, Agent, or Firm*—Andrus, Sceales, Starke & Sawall

[57] ABSTRACT

A transport mechanism for printed circuit boards is comprised of two endless drive members, movable carriers installed between these two drive members and one pair of parallel guide rails to support the carriers while moving in a horizontal state. The drive members extend diagonally between horizontal upper and lower runs on both ends of the mechanism. The carriers are installed at fixed intervals along the length of the drive members. The carriers are also provided with a roller member on both sides of the carrier to run on the upper part of the guide rail. The guide rail is further installed diagonally along the diagonal portion of the drive members at fixed intervals in order to support the carrier horizontally while in a diagonal state of movement.

11 Claims, 14 Drawing Sheets

…

AUTOMATIC REFLOW SOLDERING APPARATUS

BACKGROUND OF THE INVENTION

1. Field of the Invention

This invention relates to an automatic reflow soldering apparatus for soldering electronic components onto printed circuit boards inside a heated chamber under a high temperature environment while the printed circuit board mounted with the electronic components is conveyed along by means of a conveyor mechanism and more specifically relates to an automatic reflow soldering apparatus having an improved conveyor mechanism.

2. Description of the Related Art

In an apparatus of this type of the prior art as known for instance there is the invention of U.S. Pat. No. 5,242,096. This conveyor mechanism of this prior art apparatus is provided with an upper conveyor for transporting the carrier loaded with the printed circuit boards, a lower conveyor provided directly below the upper conveyor and an elevator mechanism to raise and lower the carrier at the ends of said conveyors. This prior art apparatus also has a means for circulating a carrier linking these separate mechanisms.

The prior art apparatus with these conveyors and elevators had a complex transport structure with many parts. Consequent problems were that production costs were high, equipment breakdowns occurred frequently and accompanying maintenance costs were also unavoidable.

Further problems were that the equipment of this prior art apparatus was both large and heavy requiring much installation space due to a complex transport structure consisting of separate mechanisms.

The present invention is therefore proposed to eliminate the technical problems and disadvantages of the prior art as stated above.

It is therefore the object of this invention to provide an automatic reflow soldering apparatus in which the carrier can be circulated by means of a simple structure, a low cost structure is achieved, equipment breakdowns are not prone to occur, maintenance costs remain low and the equipment is lightweight while taking up little space.

SUMMARY OF THE INVENTION

This invention is an automatic reflow soldering apparatus comprising a conveyor mechanism for conveying printed circuit boards mounted with electronic components and these printed circuit boards are transported along by means of a conveyor mechanism inside a heated chamber for soldering under a high temperature environment.

The conveyor mechanism is comprised of two drive members extending horizontally in an endless perpendicular state and a carrier located between the drive members and coupled for free movement along both sides of the drive members and a pair of parallel guide rails to move this carrier horizontally.

The drive members extend diagonally from a position at one end of the equipment for loading the as yet unsoldered printed circuit boards onto the carrier, to a position on the other side of the equipment for unloading the now soldered printed circuit boards from the carrier.

This carrier is placed at fixed gaps along the length of the drive member and rolling members are provided on both sides on the drive member sides to move the guide rail upper surface.

The guide rail is installed along the drive member at fixed intervals to horizontally support the carrier from the diagonal drive member from one end of the equipment to the other.

The following configurations are also provided to achieve the object of the invention. In other words, in the case of this invention, a conveyor mechanism is provided with a two drive members extended horizontally to move in an endless perpendicular state and, carriers linked for movement on the drive members at corners formed by lines at opposing angles and, an pair of parallel guide rails to move the carrier in a horizontal state.

These drive members are positioned at intervals to support the carrier horizontally. These drive members are also set in a perpendicular state at one side of the equipment body in a position to load the unsoldered printed circuit boards onto the carrier and, a position on the other side of the machine to unload the soldered printed circuit boards from the carrier.

These carriers are installed at fixed intervals along the length of the drive member and are also provided with a member on the drive member side on both sides to propel the guide rail upper surface.

The guide rails are installed laterally along the drive member from one side of the equipment body to the other at positions above and below the equipment body.

BRIEF DESCRIPTION OF THE DRAWINGS

The aforesaid and other objects and features of the present invention will become more apparent from the following detailed description and the accompanying drawings.

DESCRIPTION OF THE EMBODIMENTS

The embodiments of this invention will be described next while referring to the appended drawings.

Figure 1:
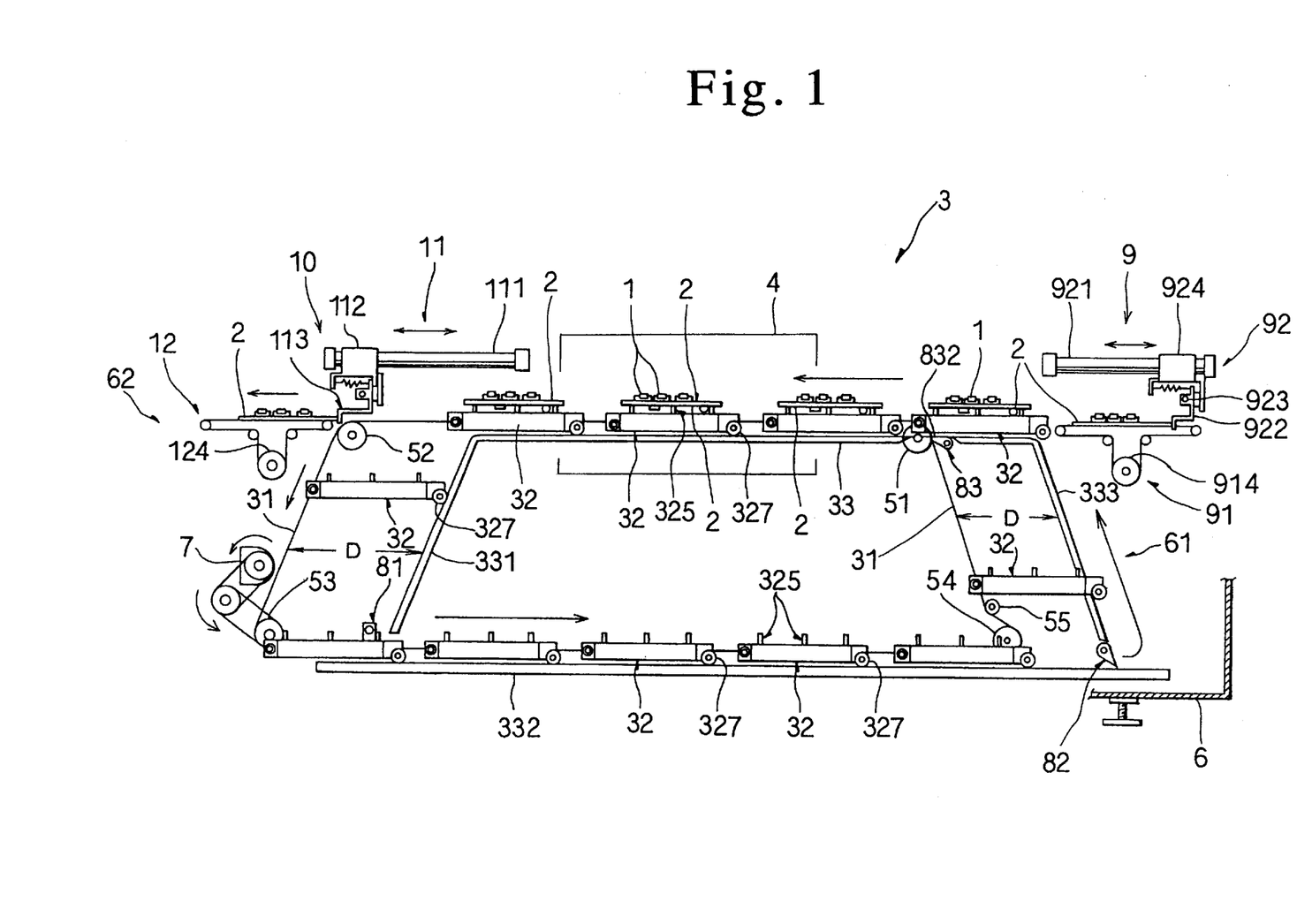
FIG. 1 is a structural view seen from the side of a typical embodiment of the mechanism of this invention.

As shown in FIG. 1, the apparatus of this invention is comprised of a conveyor mechanism 3 for transporting a printed circuit board 2 mounted with electronic components 1. This printed circuit board 2 is conveyed by the conveyor mechanism 3 and soldering of the electronic components 1 is performed in a heat chamber 4 under a high temperature environment.

This conveyor mechanism 3 is comprised of two drive members 31 extending horizontally in an endless perpendicular loop and, a carrier 32 mounted between the drive members 31 and mutually linked for movement by means of both sides of the drive member 31 and, a pair of parallel guide rails 33 to move the carrier in a horizontal position.

The drive members 31 can be made for instance of chain, wire or toothed belts, etc. The drive members 31 must maintain a stable and reliable operation in order to resist effects from the high temperatures of the heat chamber 4 and remain highly durable. Therefore, a drive member 31 is preferably made of chain from among the above examples. The chain consisting of the drive member 31 is hung from a head sprocket 51, a tail sprocket 52, a drive sprocket 53 and a corner sprocket 54 as shown in FIG. 1 and elsewhere.

In such an embodiment, the drive sprocket 53 and the corner sprocket 54 protrude to the left and right more than the head sprocket 51 and tail sprocket 52 as seen in the figure.

The drive member 31 is therefore run diagonally between a side 61 to a side 62 of the equipment body by means of the sprockets 51 through 54 to be strung in a ladder shape. The side 61 of the equipment body 6 is the position for loading the still unsoldered printed circuit boards 2 on the carrier 32. The side 62 of the equipment body 6 is the position for unloading the now soldered printed circuit boards 2 from the carrier 32. The shape in which the drive member 31 is extended in the embodiments of this invention may vary into shapes such as a ladder shape, parallel rectangle shape, or reverse ladder shape by changing the disposition of the sprockets 51 through 54. Among these shapes, the drive member 31 is preferably extended in a ladder shape. The ladder shape is preferable because it leaves space on one side 61 and the other side 62 of the equipment body 6, which can be utilized for installing a unit to load the printed circuit boards 2 onto the carrier 32 and provide a more compact configuration for the apparatus of this invention.

Reference number 55 on the drawings denotes the take-up sprocket. Besides supplying tension to the drive member 31, the take-up sprocket 55 also allows the carrier 32 to retract slightly.

Figure 2:
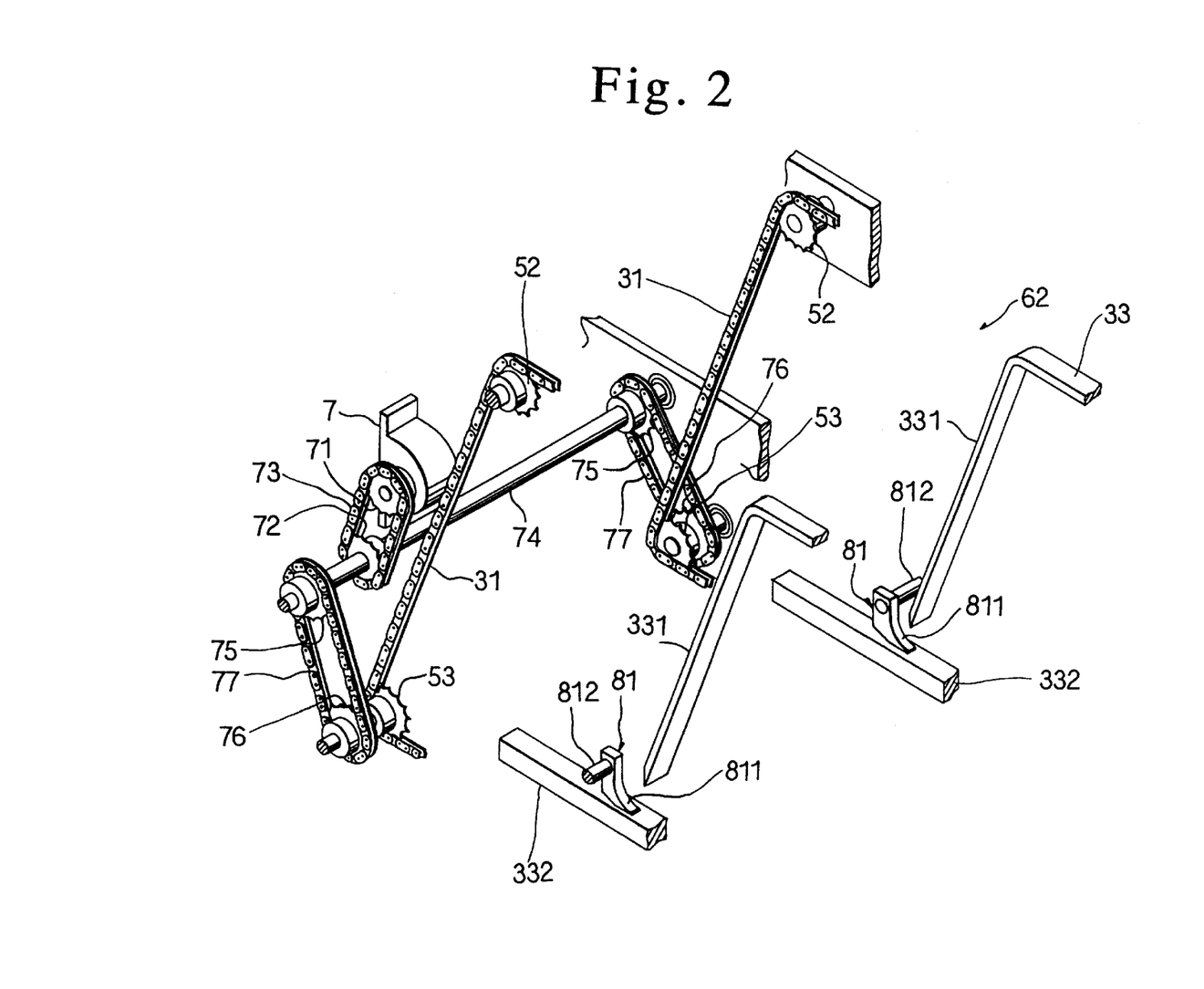
FIG. 2 is an oblique view of an essential section of the other side of the equipment body.

A drive sprocket 53 rotates in step with the rotation of a motor 7 as shown in FIGS. 1 and 2 to propel the drive part 31. More specifically, when the motor 7 rotates as shown in FIG. 2, a shaft 74 is rotated by a chain 73 hung on the sprockets 71 and 72. The rotational force of this shaft 74 is transmitted to the drive sprocket 53 by a chain 77 hung on the sprockets 75 and 76. Therefore when the motor 7 rotates, the drive sprocket 53 propels the drive member 31 which consequently circulates the carrier 32 along with the drive member 31.

Figure 3:
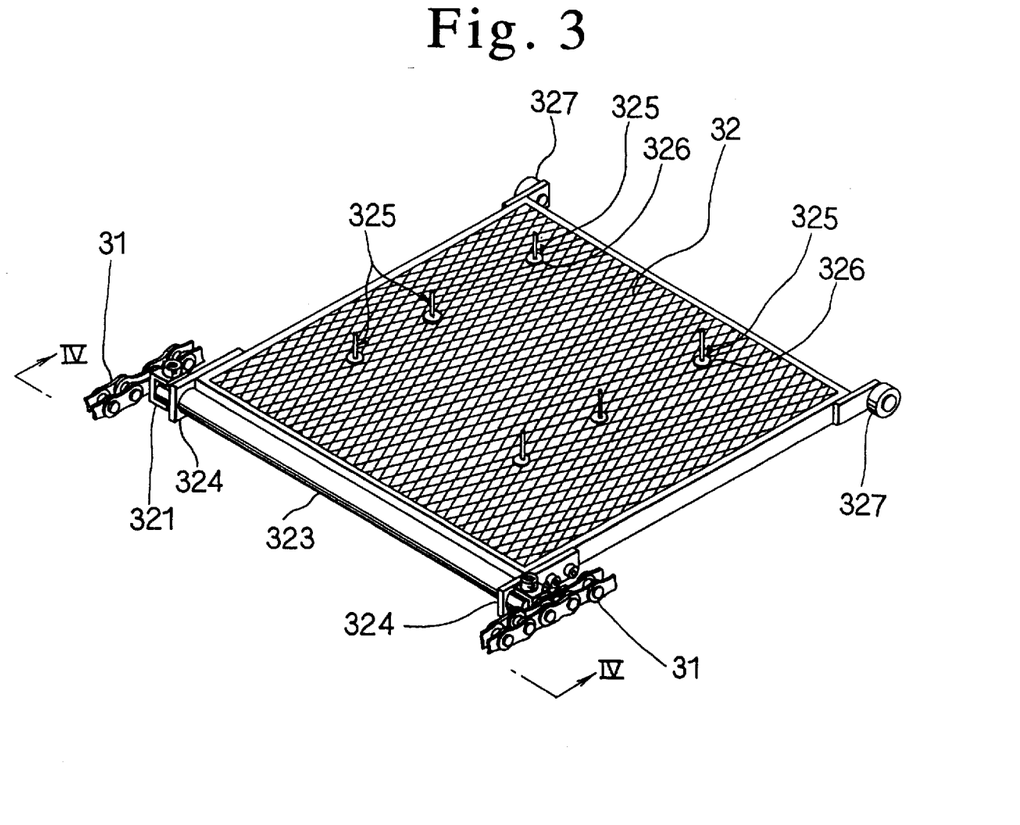
FIG. 3 is an oblique view of an essential section of the carrier.
Figure 4:
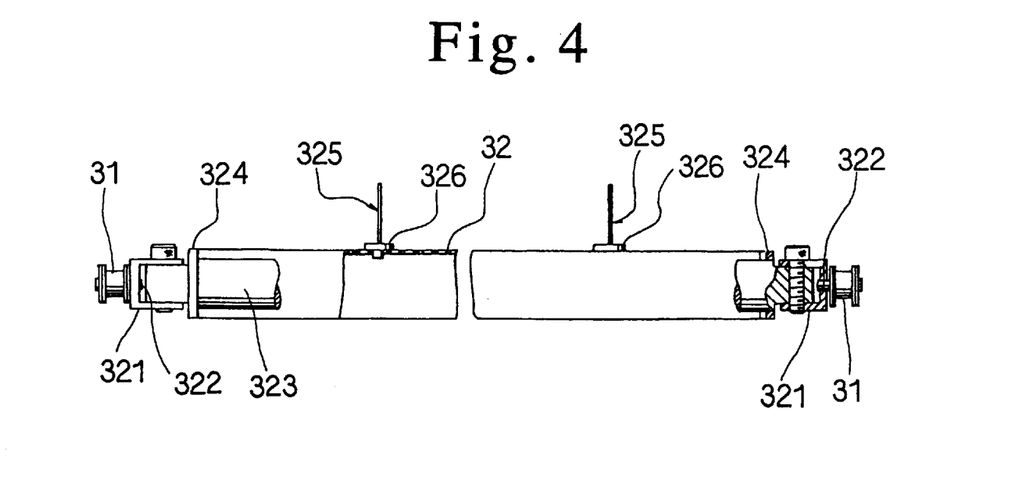
FIG. 4 is a cross sectional view of an essential section taken along line IV—IV of FIG. 3.

This carrier 32 for instance be formed in a net-shape as shown in FIG. 3 to allow heated air to contact the printed circuit board 2 as the carrier 2 passes through the heat chamber 4. This carrier 32 is preferably formed from a metal such as stainless steel for improved resistance to heat and corrosion. Reference numeral 321 in FIG. 4 denotes a notched metal piece linked by a pin 322 to the drive member 31 for movement. Reference numeral 323 denotes a rod integrated with the piece 321 and spanning to both ends of the piece 321. The carrier 32 is installed to the rod 323 for movement by means of a protruding piece 324.

The printed circuit board 2 is easily bent at the center by its own weight and the weight of the electronic components 1 when heated during soldering. This bend becomes particularly obvious when the printed circuit board 2 is thin or when large. The carrier 32 is therefore provided with a plurality of pin-shaped supports 25 to support the printed circuit board 2 horizontally and these pin-shaped support members 325 are preferably formed in the desired shape to prevent warping of the printed circuit board 2 due to heat. If warping of the printed circuit board 2 can be prevented, the soldering will be reliable and have good accuracy.

The support members 325 have a magnet 326 in the lower edge and preferably a shape allowing adherence to the carrier 32. Such a shape is preferable because it allows placement at an optimal position to align the support member 325 with the size of the printed circuit board 2.

The carrier 32 is also provided with a rolling member 327 at both sides of the drive member 31 to drive the upper surface of guide rail 33. This member can be for instance rollers or steel balls. Of these, rollers are preferred for the member 326 as a drive means. Rollers are preferred because of easy installation onto the carrier 32 and a low cost.

The carrier 32 having this kind of shape in this invention is installed at fixed intervals along the length of the drive member 31.

The guide rail 33 is installed along the drive member 31. In this case, the installation position of the guide rail 33 is on the inner side of the drive member 31 as shown in the embodiment in FIG. 5, however, the guide rail 33 can also be installed on the outer side of the drive member 31. This guide rail 33 is also installed in a diagonal state with open spaces "D" in order to support the carrier 32 in a horizontal position from the diagonal shaped drive member 31 as shown in FIG. 1, from one end 61 of the equipment body 6 to the other end 62. These spaces "D" are equivalent in this embodiment, to the distance from the notched piece 321 to the rolling member 327.

Figure 5:
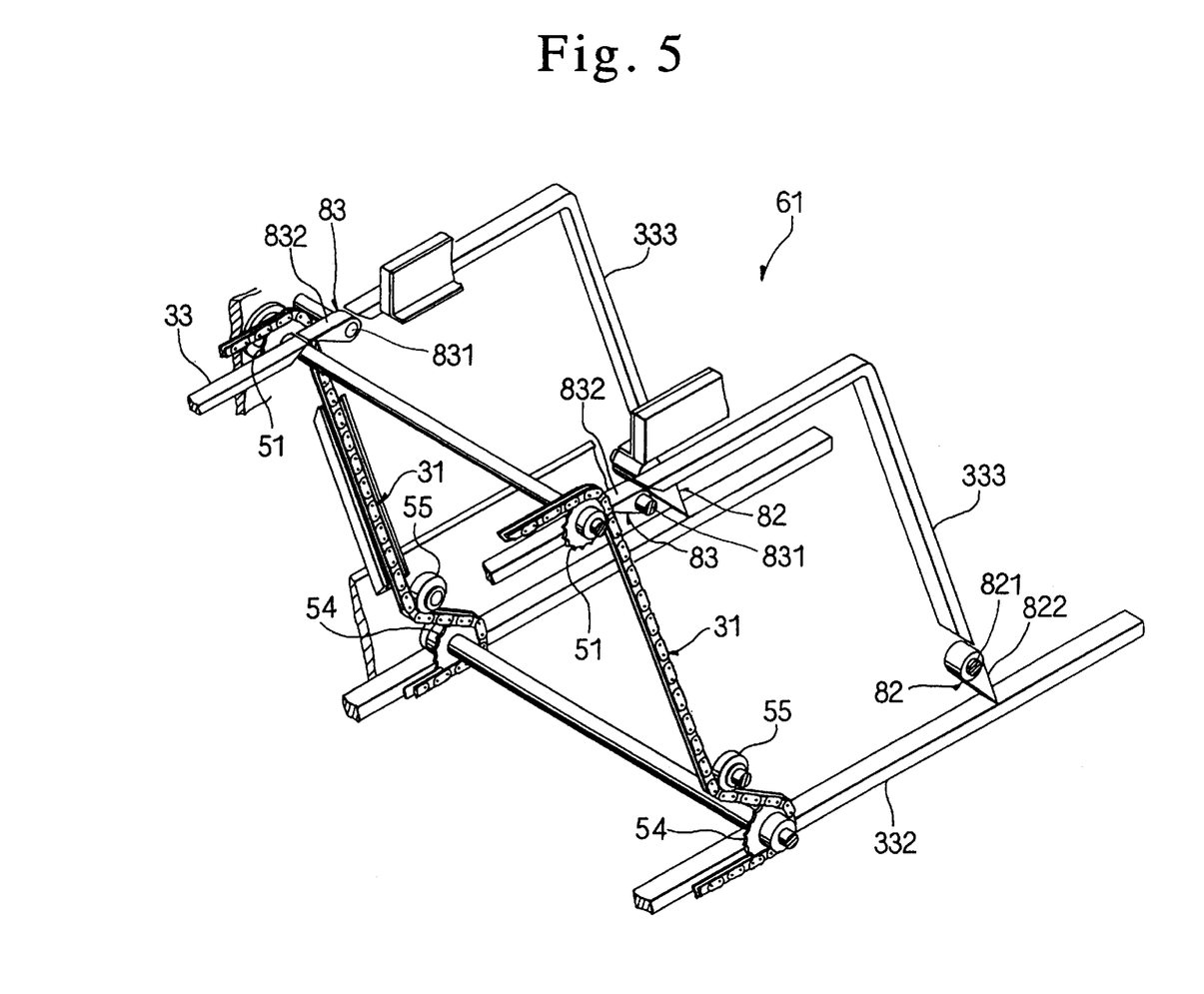
FIG. 5 is an side view of an essential section of one side of the equipment body.

Also preferable as shown in FIGS. 1, 2 and 5 is that rocking members 81, 82 and 83 be provided to ensure smooth changes in direction for the carrier 32.

The rocking member 81 as shown in FIG. 2 has an arc shaped surface 811 to guide the rolling member 327 and is mounted for rotating movement centering on the shaft 812. In this case the carrier 32 is guided smoothly along the rocking member 81 from one side 61 of the equipment body 6 to the other side 62.

Also as shown in FIG. 5, when the rocking member 82 lowers under its own weight rotating on the shaft 821, the surface 822 is formed to match the shape of a portion of the upward rising diagonal piece 333 for lifting the guide rail 33. In this case the carrier 32 can be pulled smoothly upwards.

As further shown in FIG. 5, when the rocking member 83 lowers under its own weight rotating on the shaft 831, the upper surface 832 is formed to match the shape of a portion of the guide rail 33. In this case, the carrier 32 can be smoothly guided from one side 61 of the equipment body 6 to the other side 62.

Figure 7:
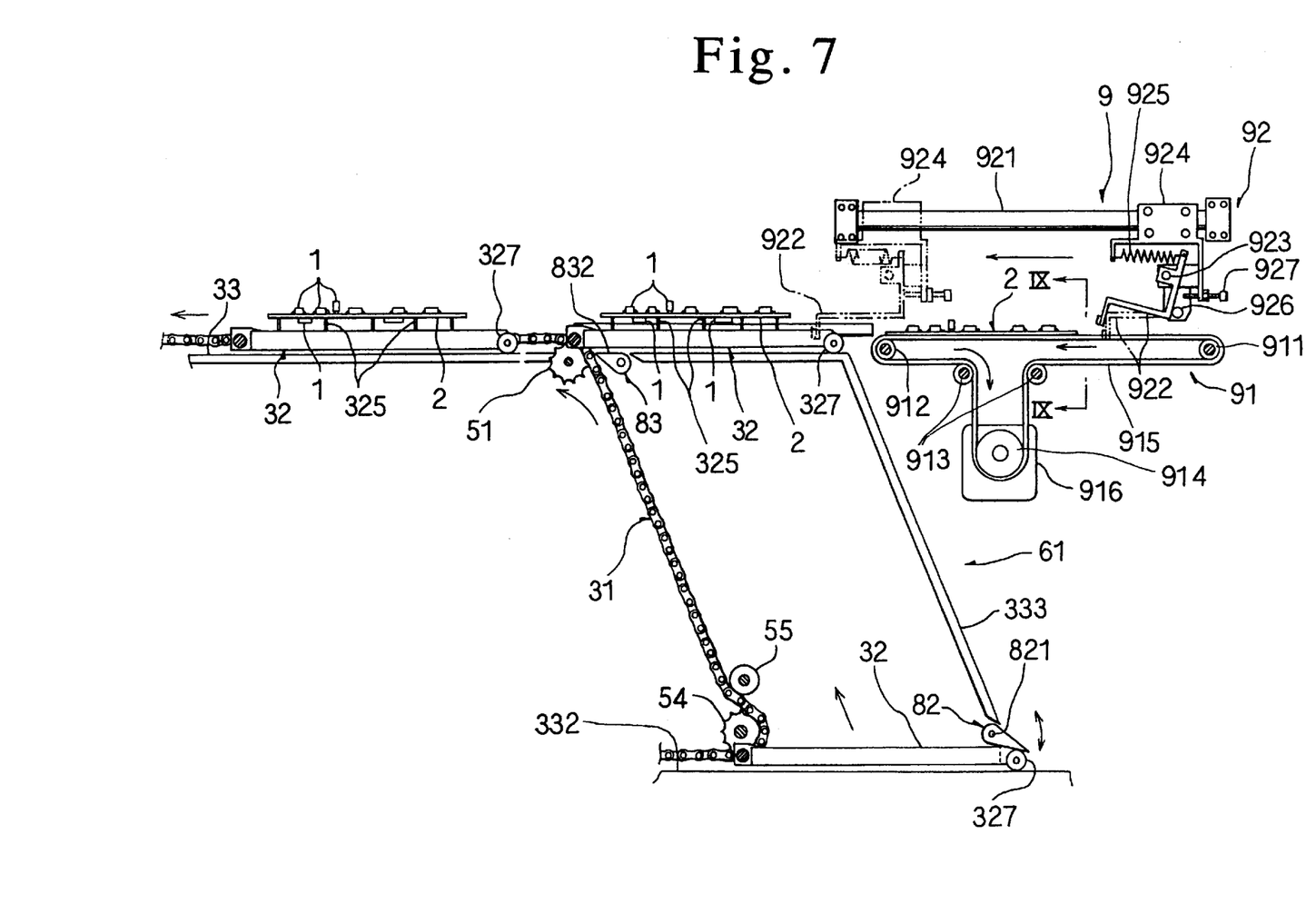
FIG. 7 is a side view of an essential section of the one side of the equipment body.

As shown in FIG. 7 for the apparatus of this invention, a loading mechanism 9 is provided at the side 61 of the equipment body 6 for loading the printed circuit boards 2 onto the carrier 32. This loading mechanism 9 as shown in FIG. 7 is comprised of a loading conveyor 91 and a pusher unit 92 for the printed circuit boards.

This load conveyor 91 has a rope 915 strung on a head pulley 911, a tail pulley 912, a bend pulley 913 and a drive pulley 914. This load conveyor 91 is configured as shown in FIG. 7 to transport the printed circuit boards 2 in the left or right directions by means of the motor 916.

Figure 8:
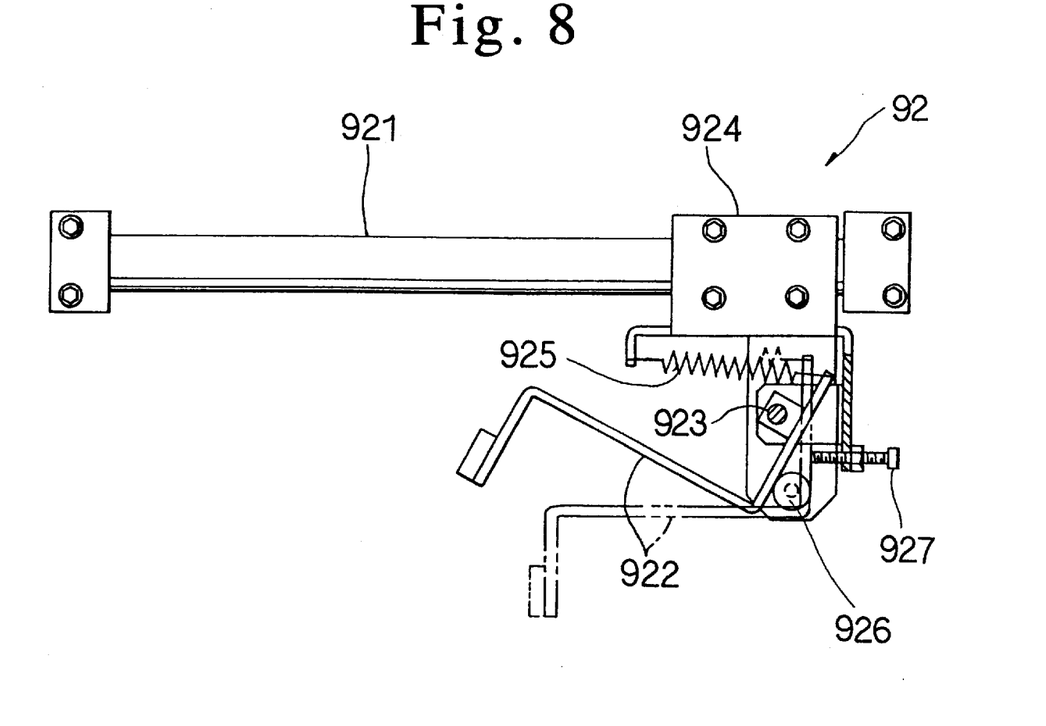
FIG. 8 is a side view of an essential section of the pusher unit for the printed circuit boards.
Figure 9:
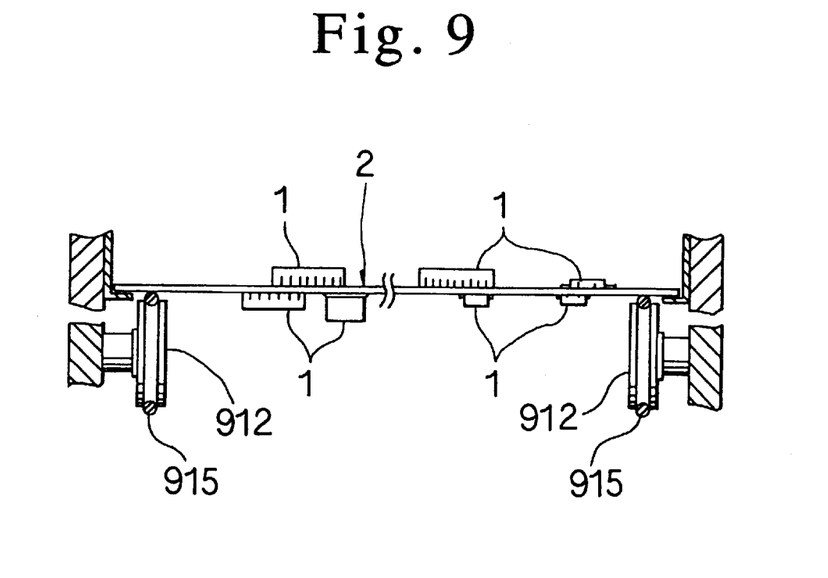
FIG. 9 is a cross section of an essential section taken along line IX—IX of FIG. 7.

The pusher unit 92 for the printed circuit boards 2 is comprised of a rodless cylinder 921 and a lever 922 for direct back and forth movement from the function of the cylinder 921. This lever 922 is formed in the shape of a crank and installed for free up and down movement at mount piece 924 of the rodless cylinder 921 by way of the pin 923. The upper edge of the lever 922 is continually pulled forward by the coil spring 925.

Figure 10:
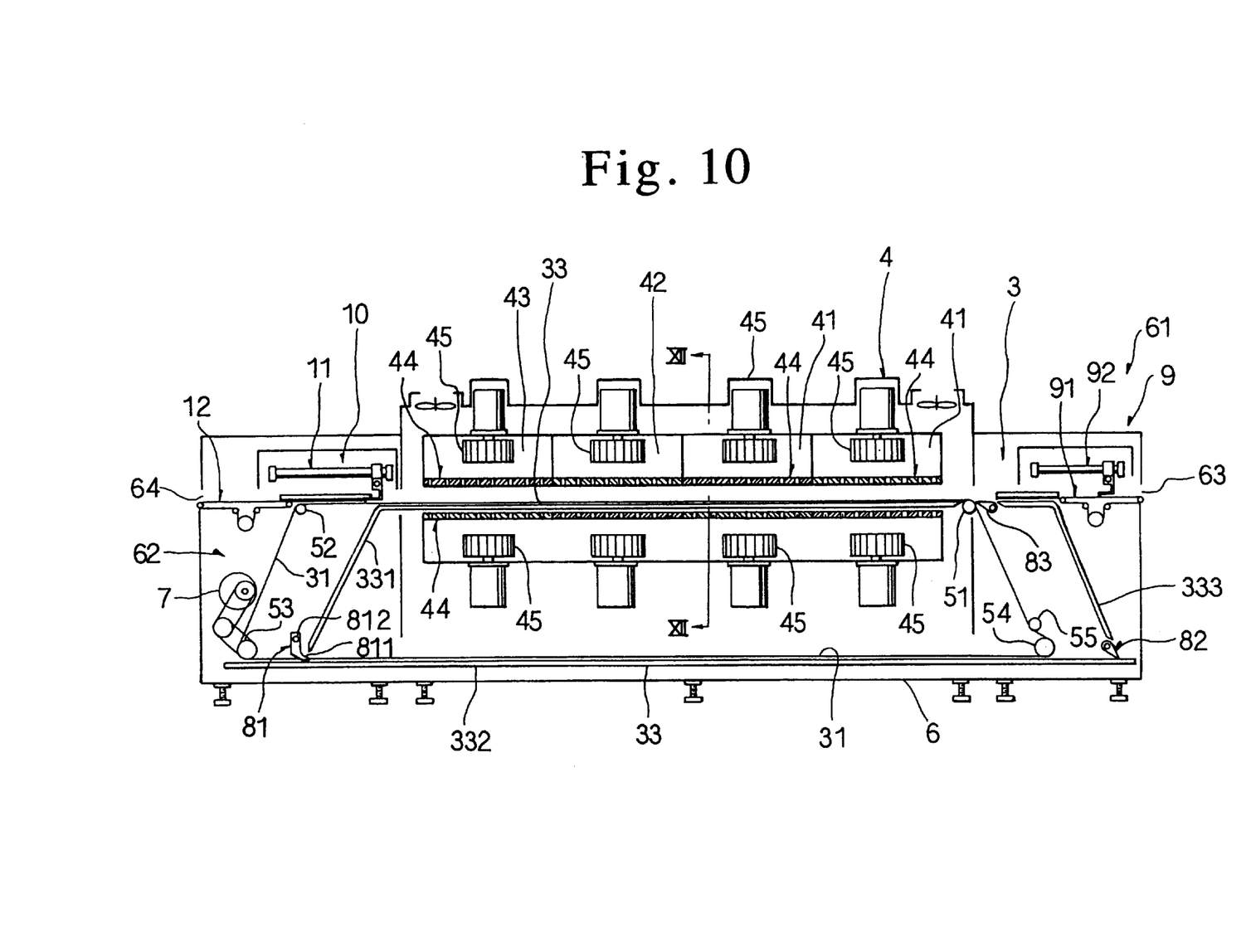
FIG. 10 is a side view showing an essential section of the structure of the heating chamber of this invention.

The stopper 926 holds the tip of the lever 922 in a raised position. This stopper 926 forms a gap between the tip of the lever 922 and the loading conveyor 91 for the printed circuit boards 2 to pass through. These printed circuit boards 2 are mounted on the loading conveyor 91 from a slot 63 formed in the equipment body 6 as shown in FIG. 10. The reference numeral 927 in FIG. 7 denotes an adjuster screw for setting the height of the tip of the lever 922. This adjuster screw 927 allows placing the tip of lever 922 in the optimum position for applying a pushing pressure on the printed circuit board 2.

At the other side 62 of the equipment body 6, an unloading unit 10 is provided to carry out the now soldered printed circuit boards 2 as shown in FIG. 1 and FIG. 10. This unloading unit 10 is comprised of the push-out unit 11 for pushing out the printed circuit boards 2 from the carrier 32, and an unloading conveyor 12 for unloading the printed circuit boards 2 received from the push-out unit 11 and conveying them from unloading exit 64 to the outside of the machine as shown in FIG. 10.

Figure 11:
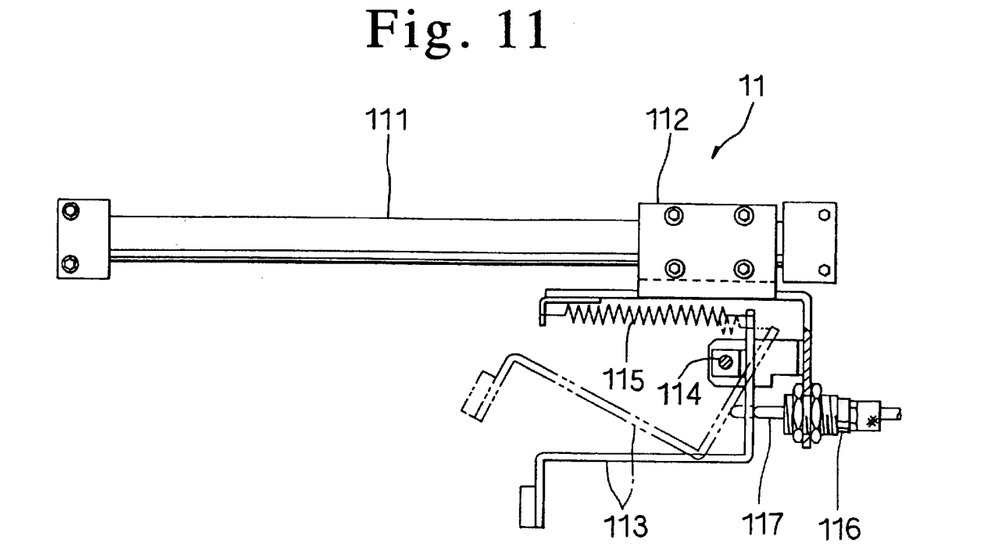
FIG. 11 is a side view showing an essential section of the push-out unit.
Figure 12:
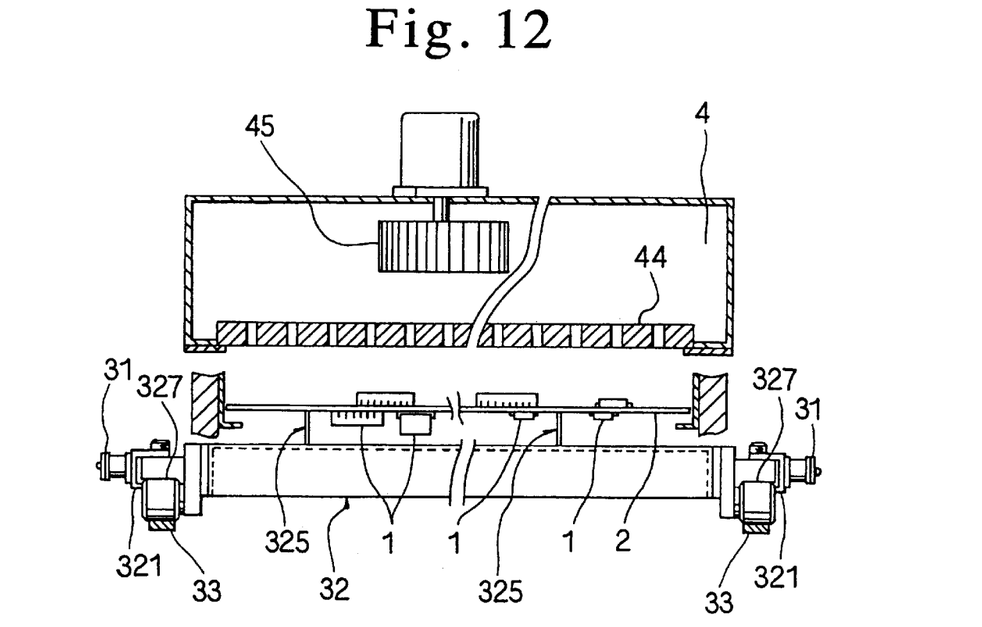
FIG. 12 is a cross sectional view of an essential section taken along line XII—XII of FIG. 10.

This push-out unit 11 is comprised of the rodless cylinder 111 and, and a lever 113 for direct back and forth action along with a mount metal piece 112 of the rodless cylinder 111 as shown in FIG. 11. This lever 113 is formed in the shape of a crank and installed for free up and down movement at the mount metal piece 112 by way of the spindle 114. The upper edge of the lever 113 is always pulled forward by the coil spring 115.

An air cylinder 116 makes the pressure pin 117 come in and out. The lever 113 is held upwards by the air cylinder 116 by an amount to just allow conveying the printed circuit board 2 on the carrier 32 as shown by the dashed line in FIG. 11. When the printed circuit board 2 passes by, the lever 113 is moved downwards by the pulling of the coil spring 115 centered on the spindle 114 and placed at the position shown by the solid line in the same drawing.

Figure 6:
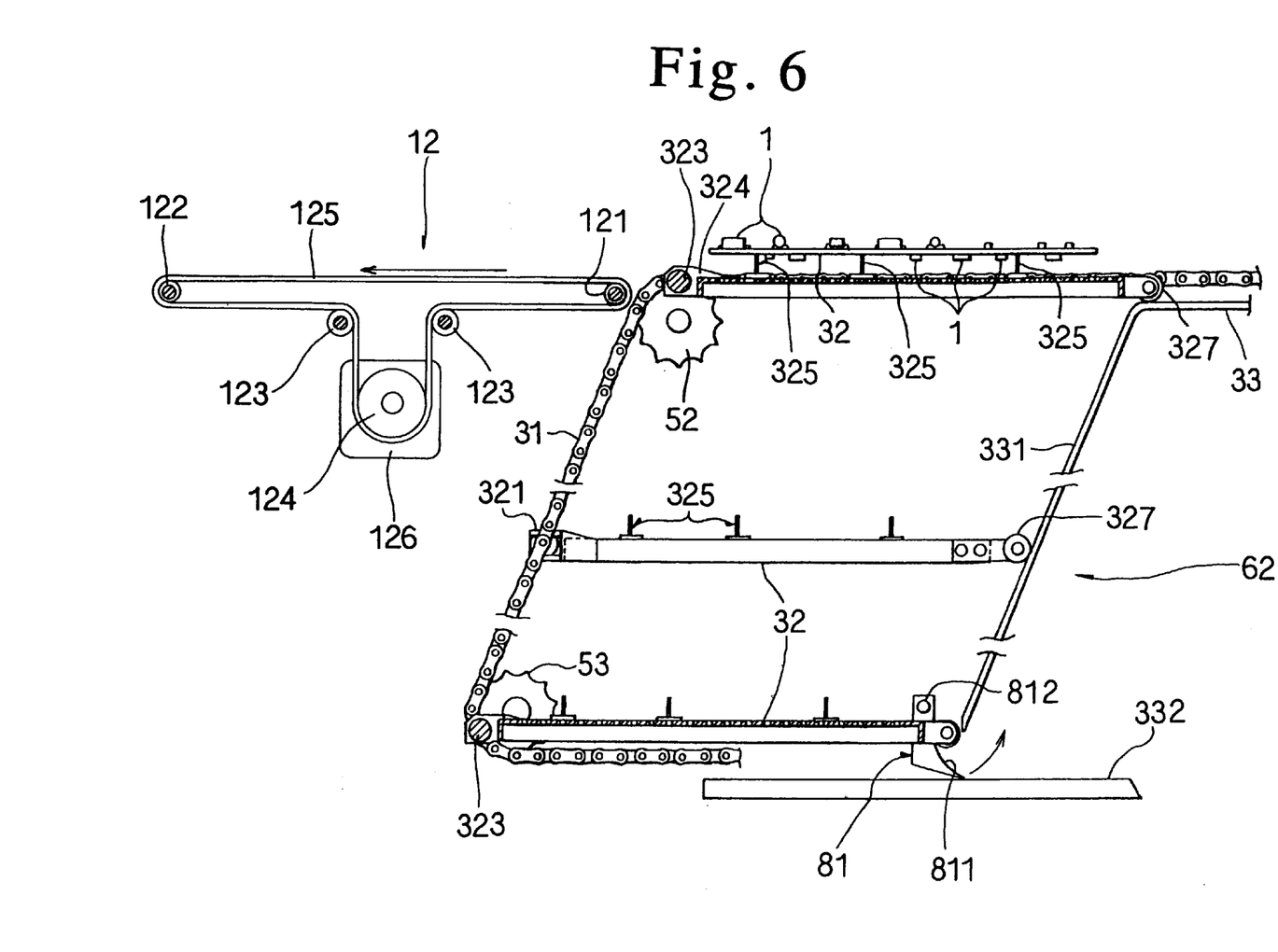
FIG. 6 is a side view of an essential section of the other side of the equipment body.

This unloading conveyor 12 has a rope 125 hung on a head pulley 121, a table pulley 122, a bend pulley 123 and a drive pulley 124 as shown in FIG. 6. The reference numeral 126 denotes the motor. This rope 125 is circulated in the direction of the arrow by the motor 126.

The heat chamber 4 is comprised of the pre-heat chambers 41, a reflow solder chamber 42, and cooling chamber 43 as shown in FIG. 10. After the printed circuit board 2 is heated up to a temperature of approximately 150° C. in the preheat chamber 41, the solder is melted in the reflow solder chamber 42 at approximately 230° C. and soldering of the printed circuit board 2 performed. After soldering, the printed circuit board 2 is allowed to slowly cool down from the high temperature in the cooling chamber 43.

Nitrogen gas is supplied as the inert gas for each of the chambers 41 through 43. This inert gas prevents oxidation of the melted solder and the wire leads of the electronic components 1. The reference numeral 44 in the drawing denotes the heater. A blower 45 circulates heated air at a speed of approximately three meters per second inside the heat chamber 4.

The function of the apparatus of this invention will be explained based on this embodiment.

Prior to soldering the printed circuit board 2 is first placed on the carrier 32 in the loading mechanism 9 at one side 61 of the equipment body 6 as shown in FIG. 1. The carrier 32 moves in unison with the drive member 31. The printed circuit board 2 passes through the heat chamber 4 and is consequently conveyed to the other side 62 of the equipment body 6. During this action, the carrier 32 is maintained in a horizontal state by the guide rail 33.

The printed circuit board 2 is soldered while passing through the heat chamber 4. During this process, a support member 325 supports the center lower surface of the printed circuit board 2 to ensure that no warping from heat occurs and the soldering is performed securely. The printed circuit board 2 soldered in the heat chamber 4 is then removed from the carrier 32 by unloading unit 10 at the other side 62 of the equipment body 6.

Figure 13:
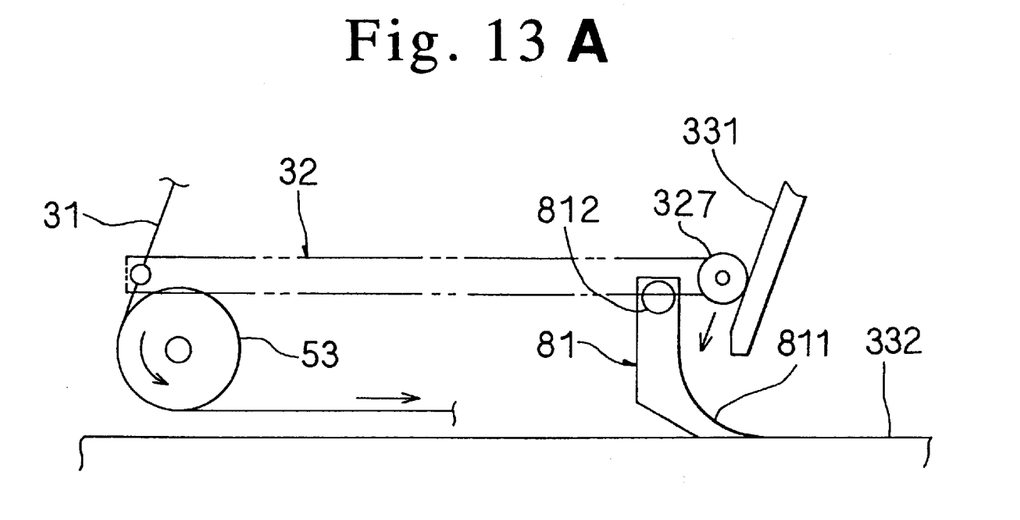
FIG. 13A and FIG. 13B are both side views of an essential section for describing the application of this invention.

The carrier 32 is next guided to a slant piece 331 of the guide rail 33 together with the drive member 31 and lowered in a horizontal state. The rolling member 327 is guided to the surface 811 of the rocking member 81 as shown in FIG. 6 and FIG. 13, and passed to the return piece 332 of the guide rail 33. Then, when the carrier 32 is pulled by the drive member 31 and slightly returned to one side 61 of the equipment body 6, the rocking member 81 is pushed upwards by the metal piece 321 of the carrier 32 as shown by the arrow in FIG. 6. This action therefore allows the carrier 32 to return.

Figure 14:
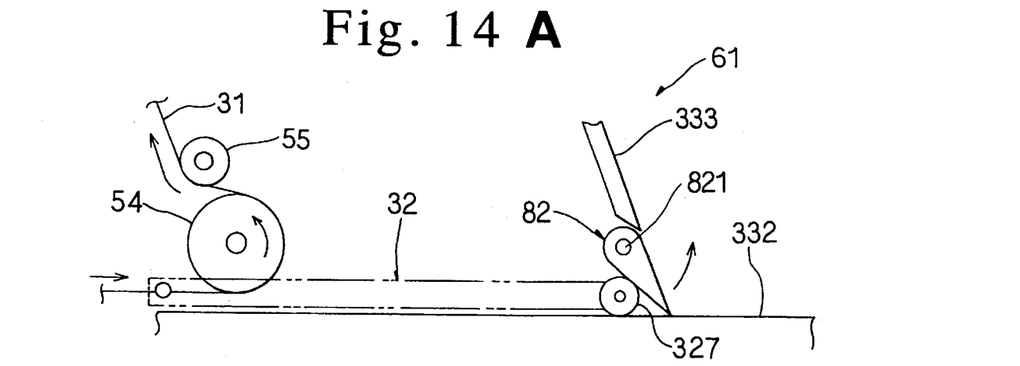
FIGS. 14A through 14D are all side views of an essential section for describing the application of this invention.

Next as shown in FIG. 14A, when the rolling member 327 strikes the rocking member 82, this rocking member 82 is pushed upwards as shown in FIG. 14B. When this rolling member 327 passes the rocking member 82, the rocking member returns under its own weight as shown in FIG. 14C. Afterwards, while the carrier 32 is being pulled upwards by the drive member 31, it retracts slightly due to the effect of the take-up sprocket 55. As a result, the rolling member 327 is guided from the surface 822 of the rocking member 82 to the slant piece 333 for raising guide rail 33 as shown in FIG. 14D. The carrier 32 is move upwards on an oblique angle while being maintained horizontally.

Figure 15:
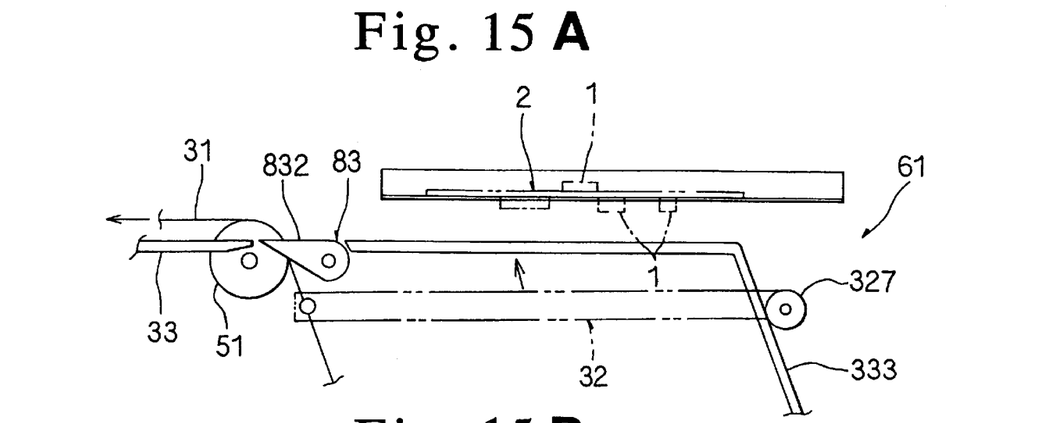
FIGS. 15A through 15C are all side views of an essential section for describing the application of this invention.

When the carrier 32 moves above the diagonal piece 333, the metal piece 32 of the carrier 32 contacts this rocking member 83. Then, as shown in FIG. 15B, this rocking piece 83 is pushed slightly upward by the metal piece 321 rotating on spindle 831. After this action, the printed circuit board 2 placed in a pre-designated position is placed on the carrier 32 by the support member 325. The rocking piece 83 moves downward slightly and the upper surface 832 joins the guide rail 33 when the printed circuit board 2 is conveyed as shown in FIG. 15C.

In the apparatus of this invention, the carriers 32 are installed at fixed intervals along the length of the drive member 31. These carriers are continuously circulated so that the printed circuit boards 2 are soldered one after another.

This invention thus circulates the carrier along with the drive member. This invention therefore can transport the carrier with a much simpler design than the conventional art which uses a combination of upper conveyor, lower conveyor and elevator mechanism to transport the carrier.

The apparatus can consequently be inexpensively manufactured, will have fewer breakdowns and low maintenance costs. The apparatus can also be made compact and lightweight since the transport mechanism is simple.

Figure 16:
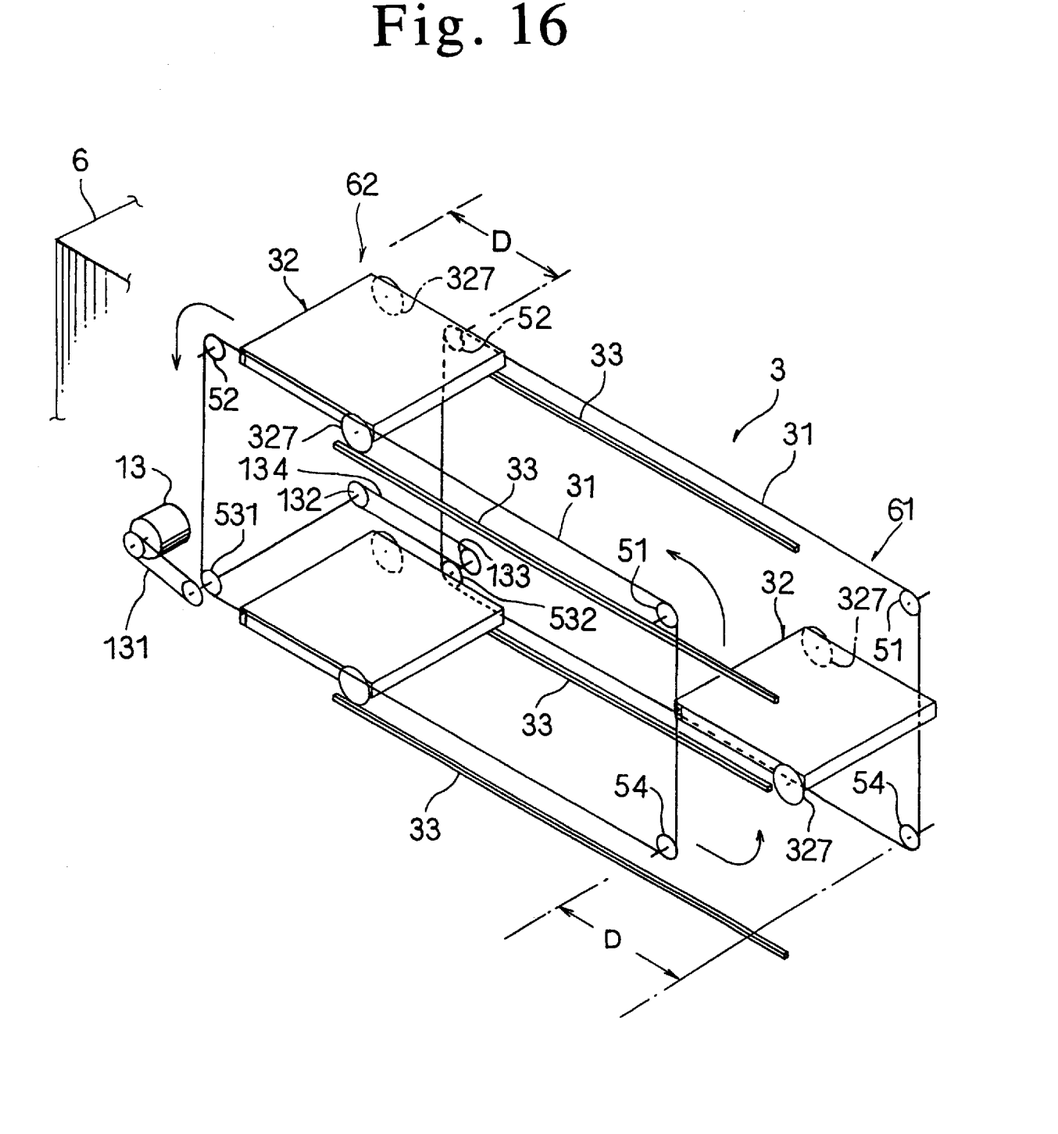
FIG. 16 is an oblique view of an essential section showing another embodiment of this invention.
Figure 17:
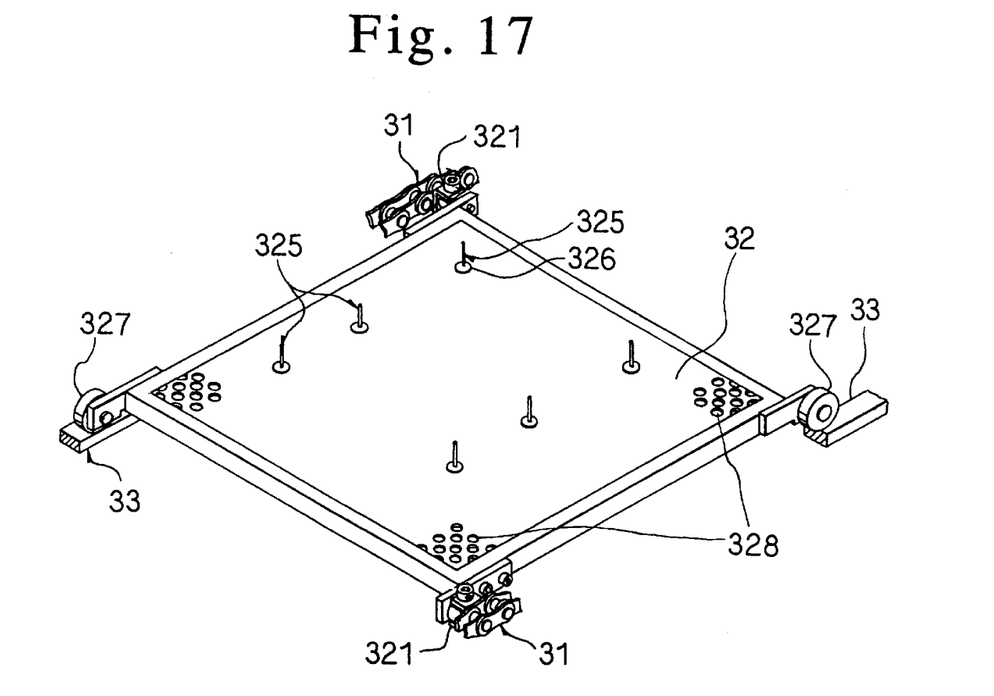
FIG. 17 is an oblique view showing an essential section of the carrier for the embodiment in FIG. 16.
Figure 18:
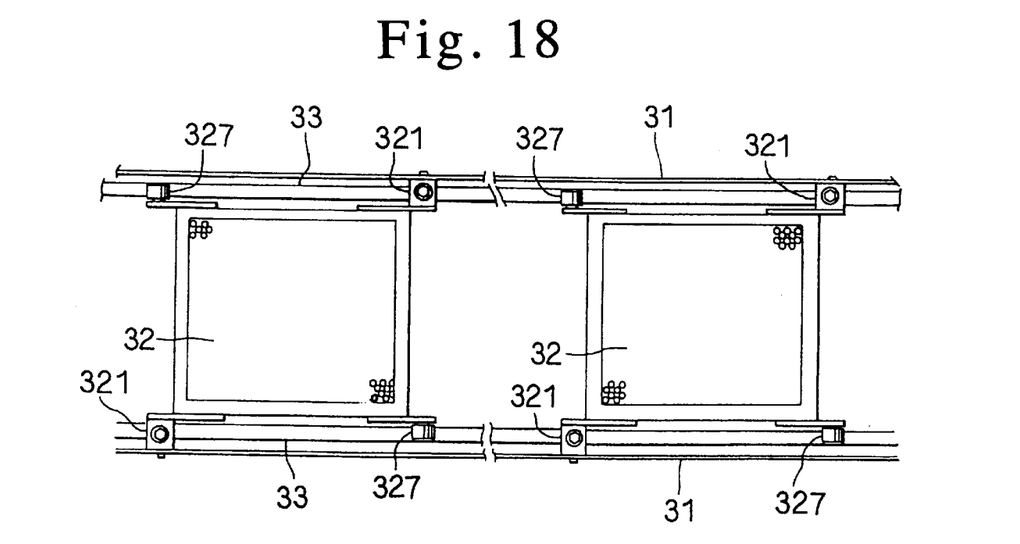
FIG. 18 is a plan view of an essential section of the embodiment in FIG. 16.

Other embodiments of this invention will be described next while referring to FIG. 16 through FIG. 18.

This conveyor mechanism 3 is comprised of two drive members 31 extending horizontally in an endless perpendicular loop. These drive members 31 are positioned at open spaces "D" in order to horizontally support the carrier 32. In this embodiment, these open spaces "D" are equivalent to the length of the carrier 32 on the drive member 21 side. The drive members 31 moreover extend from one side of the equipment body 6, to the other side 62 in a perpendicular shape.

The carrier 32 is placed between the two drive members 31 for consecutive movement in a line along the opposing corners formed versus drive member 31. Reference numeral 321 in FIGS. 17 and 18 denotes a notched metal piece installed for movement along the drive member 31. The carrier 32 is installed on notched metal piece 321 along the opposing corners.

In this embodiment, the carrier 32 is a metal plate having numerous punch holes 328. The carrier 32 has a support member 325 to horizontally support the printed circuit board 2, just as with the embodiment in FIG. 1. This support member 325 is formed with a permanent magnet 326 to adhere to the carrier 32.

The rolling member 327 is positioned at the corners on a line from the opposing angles of carrier 32 for stable drive of the carrier 32. The placement of the rolling member 327 need not be restricted to this position and can be placed as needed on both sides of the carrier 32 on the drive member 31 side. The carrier 32 is installed at fixed intervals along the length of the drive member 31 as shown in FIG. 18.

The reference numeral 33 denotes a pair of parallel guide rails to allow horizontal movement of the carrier 32. This guide rail 33 laterally spans from one side 61 of the equipment body 6 to the other side 62 along the drive members 31 as shown in FIG. 16 and is installed at positions above and below the equipment body 6. This guide rail 33 is preferably mounted in a slightly offset position as shown in the figure. This ensures the carrier 32 quickly attains a stable drive after rising and lowering.

The reference number 13 denotes the motor. The motive rotational force from the motor is transmitted to a drive sprocket 531 by way of a chain 131. A drive sprocket 532 on the other side is configured to move in the same direction and the same speed as the other drive sprocket 531 by way of a chain 134 hung on the sprockets 132 and 133.

The operation of the carrier 32 as relating to this embodiment is explained next.

When the motor 13 rotates, the drive sprockets 531 and 532 move the drive member 31 along in the same speed and the same direction. The carrier 32 therefore moves along with the drive member 31 and the printed circuit boards 2 are conveyed by this carrier 32.

The now soldered printed circuit boards 2 are removed from the carrier on the other side 62 of the equipment body 6. The empty carrier 32 now lowers perpendicularly along with the drive member 31. This empty carrier is now returned along with the drive member 31 to one side 61 of the equipment body 6 and later raises perpendicularly and circulates as already described to allow the next soldering operation to be performed.

The apparatus of this embodiment configured this way, besides having the same effect as the embodiment of FIG. 1, the guide rail can also be omitted between one end of the equipment body and the other end. Consequently, a simpler structure of the conveyor mechanism of the apparatus of this invention and a more inexpensive apparatus can be provided.

The entire disclosure of Japanese Patent Application No. 9-21042 filed on Jan. 20, 1997 including the specification, claims, drawings and summary are incorporated herein by reference in its entirety.

What is claimed is:

1. An automatic reflow soldering apparatus for soldering electronic components onto printed circuit boards inside a heated chamber under a high temperature environment while said printed circuit boards mounted with said electronic components are transported along by means of a conveyor mechanism comprising:

parallel drive members extending in an endless path through the apparatus, a plurality of carriers attached at fixed gaps along the length of said drive members, portions of said drive members extending diagonally from one end of the apparatus for loading unsoldered printed circuit boards onto a carrier and from the other end of the apparatus for unloading soldered circuit boards from said carrier, and diagonal guide rail sections positioned along the diagonal portions of the drive members and at a fixed spacing therefrom to horizontally support the carrier for movement along said diagonal portions.

2. An automatic reflow soldering apparatus according to claim 1 wherein said drive members include upper and lower horizontal portions respectively connecting the upper and lower ends and the lower ends of the diagonal portions of said drive members, and corresponding upper and lower guide rail sections.

3. An automatic reflow soldering apparatus according to claim 2 wherein said drive members extend in a trapezoidal path.

4. An automatic reflow soldering apparatus according to claim 2 wherein rolling members are attached to both sides of the carrier to support the carrier for movement along said guide rail sections.

5. An automatic reflow soldering apparatus according to claim 4 wherein a rocking member is installed at the bottom end of each diagonal section of the guide rail to guide the rolling members for the carrier and to allow movement of said rolling members between diagonal and horizontal guide rail sections.

6. An automatic reflow soldering apparatus according to claim 5 wherein one of said rocking members is pulled up to allow passage of the rolling member that moves the carrier from one end of the apparatus to the opposite end, and when the rolling member passes, the rocking member lowers and the upper surface of said member becomes a part of said diagonal guide rail section, with said rocking member guiding said rolling member upwards.

7. An automatic reflow soldering apparatus for soldering electronic components onto printed circuit boards inside a heated chamber under a high temperature environment while said printed circuit boards mounted with said electronic components are transported along by means of a conveyor mechanism wherein, said conveyor mechanism is comprised of two drive members each extending through horizontal upper and lower runs in an endless loop perpendicular to the horizontal, a rectangular carrier located between said drive members and coupled for movement to the drive members on diagonally opposite corners, and a pair of parallel guide rails for each of the upper and lower runs of the drive members to support the carrier for horizontal movement, said drive members positioned to move the carrier horizontally from one end of the apparatus in a position to load the unsoldered printed circuit boards onto the carrier, to a position on the other end of the apparatus to unload the soldered printed circuit boards from the carrier, a plurality of said carriers placed at fixed gaps along the length of said drive members, and rolling members provided on both sides of each carrier to support said carriers for movement along the guide rails.

8. An automatic reflow soldering apparatus according to claim 7 wherein said carrier has a plurality of pin-shaped support members to horizontally support the printed circuit board, and said support members deform to prevent warping of the printed circuit board due to heat.

9. An automatic reflow soldering apparatus according to claim 7 wherein the drive member is a chain.

10. An automatic reflow soldering apparatus according to claim 7 wherein the rolling member is a roller.

11. An automatic reflow soldering apparatus according to claim 7 wherein said drive members are offset from one another in the direction of horizontal movement by an interval approximately equal to the length of the carrier.

\* \* \* \* \*